United States Patent [19]

Kinsell

[11] Patent Number: 5,221,861
[45] Date of Patent: Jun. 22, 1993

[54] VOLTAGE MAINTENANCE SYSTEM

[76] Inventor: David A. Kinsell, 1216 SE. 43rd Ter., Cape Coral, Fla. 33904

[21] Appl. No.: 653,787

[22] Filed: Feb. 11, 1991

Related U.S. Application Data

[63] Continuation-in-part of Ser. No. 438,064, Nov. 20, 1989, abandoned.

[51] Int. Cl.$^5$ .............. B60L 1/00; H02J 7/34; F02N 17/00; B63H 21/22
[52] U.S. Cl. ............... 307/9.1; 123/179.3; 307/23; 440/1; 440/85
[58] Field of Search .......... 307/9.1, 10.1, 10.6, 307/10.7, 64–66, 85–87, 23, 29; 323/267, 271, 272; 180/65.8; 340/636, 653; 440/1, 85; 123/179.3, 179.1; 320/15

[56] References Cited

U.S. PATENT DOCUMENTS

| | | | |
|---|---|---|---|
| 2,729,750 | 1/1956 | Draper et al. | 307/10.7 |
| 3,340,402 | 9/1967 | Curtis | 307/10.1 |
| 3,753,001 | 8/1973 | Hiroshima et al. | 307/10.1 |
| 4,127,782 | 11/1978 | Omura et al. | 307/10.1 |
| 4,489,242 | 12/1984 | Worst | 307/10.1 |
| 4,754,730 | 7/1988 | Campagna | 123/179.3 |
| 4,780,618 | 10/1988 | Wareman et al. | 307/9.1 |
| 5,136,179 | 8/1992 | Kanno | 440/1 |

Primary Examiner—A. D. Pellinen
Assistant Examiner—Richard T. Elms
Attorney, Agent, or Firm—William E. Noonan

[57] ABSTRACT

A voltage maintenance system is provided for an engine-driven vehicle having a primary battery, a starter that is energized by the primary battery, an ignition switch for selectively and momentarily activating the starter to start the engine and one or more electrical accessories that are electrically connected to and energized by the primary battery during normal operation of the vehicle. The voltage maintenance system includes a secondary battery. The system senses activation and subsequent de-activation of the starter each time the engine is started. A switching circuit is provided for electrically connecting the secondary battery to the electrical accessories and electrically isolating the primary battery from the electrical accessories such that the secondary battery energizes the electrical accessories each time activation of the starter is sensed. The switching circuit also electrically disconnects the secondary battery from the electrical accessories and electrically reconnects the primary battery to the electrical accessories when the starter is subsequently deactivated.

10 Claims, 2 Drawing Sheets

VOLTAGE MAINTENANCE SYSTEM

RELATED APPLICATION

This application is a continuation-in-part of Ser. No. 438,064, filed Nov. 20, 1989, now abandoned.

FIELD OF THE INVENTION

The present invention generally relates to a voltage maintenance system or more specifically a device which maintains a substantially constant voltage supply to maintain operation of electronic equipment subject to malfunction, shutdown or other adverse effects from low voltage. It is specifically adapted for use with engine-driven vehicles such as boats of the type having electric starting motors powered by batteries with various electronic equipment on board the boat, also being powered by the same batteries. The voltage maintenance system includes an arrangement of electronic components associated with the boat engine or engines and storage battery or batteries to assure that adequate voltage supply is maintained to the electronic equipment when the boat engine or engines are being cranked by a starting motor which frequently results in a temporary lowering of voltage available to electronic equipment thus causing the electronic equipment to malfunction, shutdown or otherwise adversely affect the operation of the electronic equipment.

BACKGROUND OF INVENTION

Presently available boats are frequently equipped with relatively sophisticated electronic equipment including video depth sounders, radars, automatic pilots, loran-c receivers and the like which basically are constructed to operate with a voltage supply between 11 and 14 volts DC. It is also well known that when the engine of a boat is started by using the electric starting motor, a voltage drop occurs inasmuch as the electric starting motor consumes a large portion of the electrical energy available from the storage batteries which is usually a 12 volt battery providing electrical energy to a conventional 12 volt DC electrical system found on most present day boats, with the electronic equipment operating between 11 and 14 volts DC. While the voltage supply between 11 and 14 volts is adequate to maintain the electronics operational, when a boat's engine is being started, the voltage drop to 9 volts or less which can cause many marine electronic components to shutdown or freeze operation especially the components found on present day boats. When this occurs, some of the electronic equipment requires several minutes to warm up and commence proper operation thereby causing the operator significant inconvenience. For example, many video depth sounders need to be set to the proper mode and depth scale each time they are powered up and some autopilots may freeze operation if a voltage drop occurs when in operation thus requiring the equipment to be shut off and switched back on again before normal operation can resume. It is also well known that frequently the boat's engines need to be re-started after the electronic equipment has been previously powered up such as when stopping for fuel or fishing at several different locations on a single outing. The Coast Guard and other law enforcement agencies rely heavily upon radar. This instrument is likewise liable to be lost temporarily after the vessel has stopped for boarding otherwise and when the engines are re-started. Presently, a system is required that will maintain adequate voltage to the electronic components of a boat or other vehicle in order to provide continuous operation during repeated starts.

Efforts have been made to provide auxiliary or alternative power sources to supply electrical energy to a load in response to various load conditions. However, although conventional techniques use alternative power sources and devices are provided for maintaining a predetermined voltage supply, such techniques do not disclose the specific circuit arrangement for automatically switching a load from one power source to another and isolating the loads and power sources including the specific relationship of the primary and secondary batteries and electronic components incorporated into this invention. None of the known devices allow the electronic accessories of a boat or other vehicle to remain fully charged during momentary operation of the engine starter.

SUMMARY OF THE INVENTION

An object of the present invention is to provide a device which will maintain an adequate voltage level that will sustain operation of electronic components, especially electronic components mounted on boats during normal operating conditions of the boat such as when starting the engine or engines, which conventionally introduces peak load conditions on the storage battery source of electrical energy thereby reducing the voltage available to the electronic components and resulting in such components shutting down, freezing, malfunctioning or otherwise being adversely affected by low voltage conditions.

Another object of this invention is to provide a voltage maintenance module incorporating a circuit board with a terminal strip meeting all safety standards for electrical connections that may be required by the Coast Guard or other similar regulatory agencies.

A further object of this invention is to provide a voltage maintenance module, which includes two separate and isolated input terminals having components which enable electrical energy to flow from a secondary battery when the boat's primary engine or engines are being started. This enables the secondary battery to remain untapped by the voltage maintenance module when the boat is underway or sitting idle at the dock or fishing thereby enabling electrical energy to be utilized from only the primary battery or battery bank while the secondary battery or battery bank remains charged. This retains the secondary battery or battery bank in fully charged condition to supply electrical energy at a proper voltage level to maintain operation of the electronic components when the boat's primary engine or engines are being started.

This invention features a voltage maintenance system for an engine-driven vehicle such as a boat having primary battery means, a starter that is energized by the primary battery means, ignition means for selectively and momentarily activating the starter to start the engine and electrical accessory means that are electrically connected to and energized by the primary battery means during normal operation of the vehicle. The system includes secondary battery means and means for sensing activation and subsequent de-activation of the starter each time the engine is started. There are switching means, responsive to the means for sensing, for electrically connecting the secondary battery means to the electrical accessory means and electrically isolating the primary battery means from the electrical accessory means such that the secondary battery means energize the electrical accessory means each time activation of the starter is sensed. The switching means also electrically disconnect the secondary battery means from the electrical accessory means and electrically re-connect the primary battery means to the electrical accessory means when the starter is subsequently deactivated.

In a preferred embodiment the means for sensing include means for generating and conducting a start signal indicative of activation of the starter, which start signal is subsequently eliminated upon deactivation of the starter. The switching means may include a first switch and switch actuator means that are responsive to the start signal for actuating the first switch to connect the secondary battery means to, and electrically isolate the primary battery means from the electrical accessory means. The switch actuator means are further responsive to the subsequent elimination of the start signal for alternating the first switch to disconnect the secondary battery means from and electrically re-connect the primary battery means to the electrical accessory means. The first switch may include a relay switch and the switch actuator may include a second switch, such as a transistor switch. More particularly, the relay switch may include a coil that is selectively connected at one end to the primary battery means when the primary battery means are electrically connected to the electrical accessory means and to the secondary battery means when the secondary battery means are electrically connected to the electrical accessory means. The transistor switch may include a base that is electrically connected to the means for generating and conducting for receiving the start signal therefrom, a collector that is connected to the other end of the coil, and an emitter that is connected to a ground conductor. Such transistor switch is responsive to the presence of the start signal at the base for conducting current through the coil to energize the relay switch and is responsive to a subsequent elimination of the signal from the base for blocking the flow of current through the coil to deenergize the relay switch.

Primary and secondary input means may be connected to the primary and secondary battery means, respectively and output means may be connected between the primary input means and the electrical accessory means. The switching means may be alternated between a first state, wherein the secondary input means and the output means are electrically connected and the primary input means are electrically isolated from the output means, and a second state wherein the secondary input means are disconnected from the output means and the primary input means are electrically connected to the output means. Primary diode means may be disposed between the primary input means and the output means for restricting current flow from the output means to the primary input means when the output means are at a greater voltage than the primary input means.

The above objects, together with other objects and advantages which will become subsequently apparent, reside in the details of construction and operation as more fully described and claimed, reference being had to the accompanying drawings forming a part thereof, wherein like numerals refer to like parts throughout.

DESCRIPTION OF PREFERRED EMBODIMENT

Figure 1:
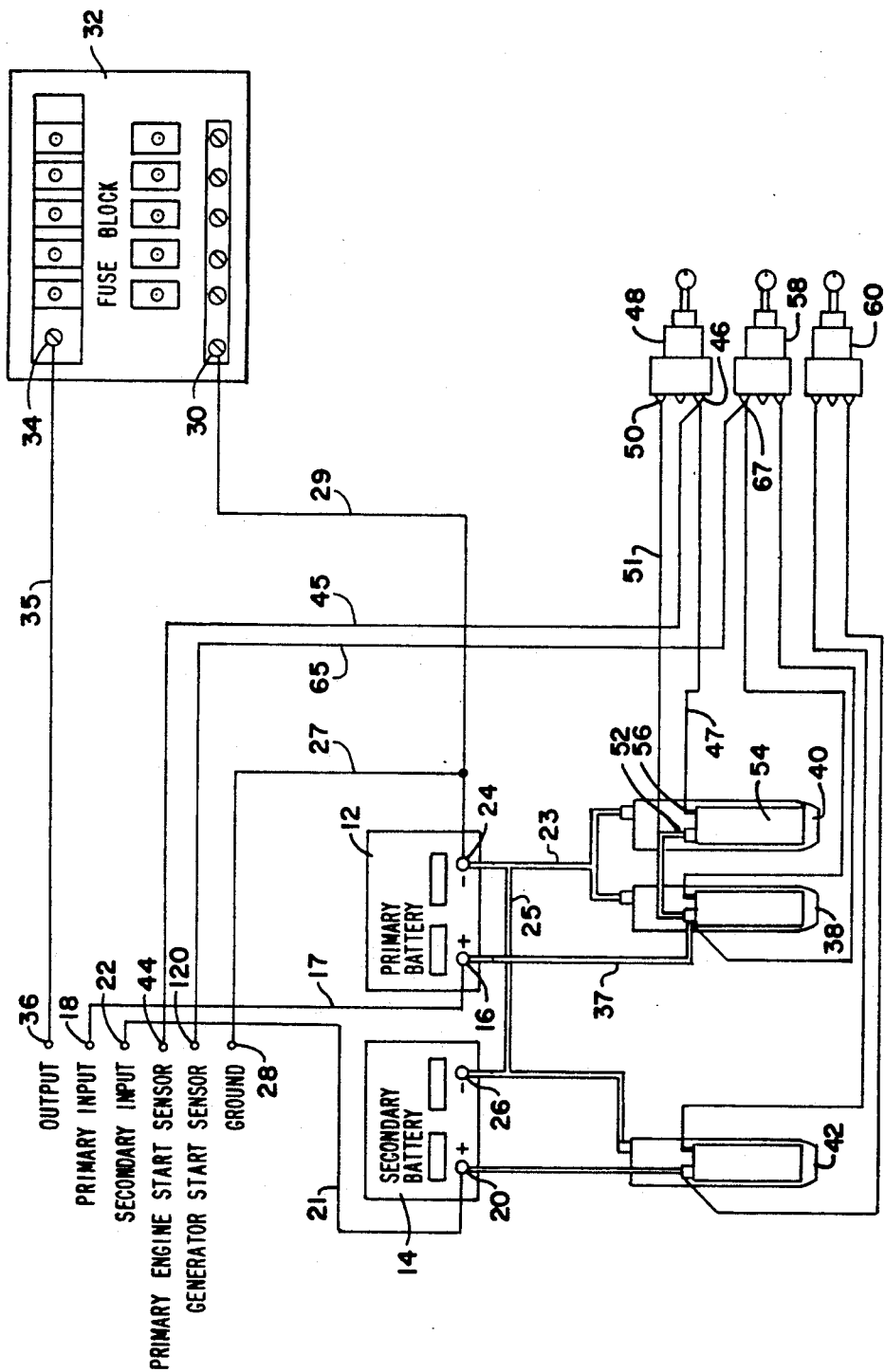
FIG. 1 is a wiring diagram showing a typical installation of the voltage maintenance system of this invention, including batteries, starters, ignition switches, and a fuse box.
Figure 2:
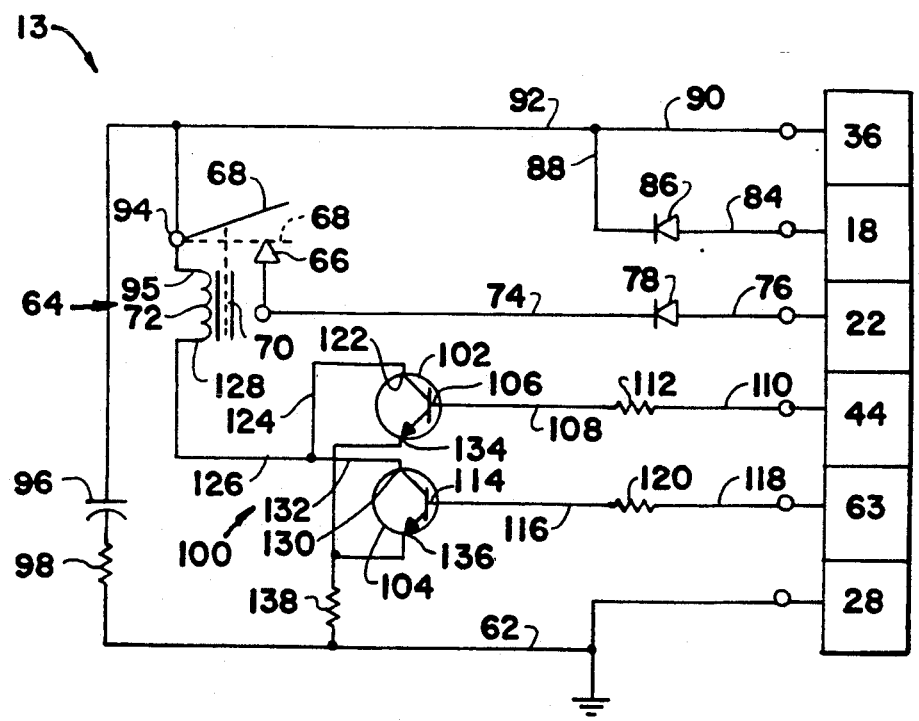
FIG. 2 is a schematic view of the voltage maintenance module's components.

Referring now to FIGS. 1 and 2, the voltage maintenance system of the present invention is connected to the electrical system of a boat, which includes a primary battery 12, starters 38, 40 and 42, ignition switches 48, 58 and 60, and a fuse box 32 for electrical accessories. The voltage maintenance system includes a secondary battery 14, as illustrated in FIG. 1, and a voltage maintenance circuit as shown in FIGS. 1 and 2. The components shown in FIG. 2 define a voltage maintenance module 13. The positive terminal 16 of the primary battery is connected by conductor 17 to a primary input 18 and the secondary battery 14 includes a positive terminal 20 connected by conductor 21 to a secondary input 22. The negative terminal 24 on the primary battery 12 and the negative terminal 26 on the secondary battery 14 are connected together by conductor 25 to form a common ground. Ground terminal 28 is connected by conductor 27 to negative terminal 24 of battery 12. Conductor 29 couples negative terminal 24 of battery 12 to a negative terminal strip 30 on a fuse block 32 which also includes a positive terminal strip 34 connected by conductor 35 to an output 36. As illustrated in FIG. 1, the boat includes twin engines and an auxiliary generator and includes starters 38, 40 and 42, all of which are connected to the ground terminals 24 and 26 and with the negative terminal strip 30 on the fuse block 32 and ground terminal 28 of the voltage maintenance module.

When in its standby mode, the voltage maintenance module 13 conducts current from the positive terminal 16 on the primary battery 12 through conductor 17 to primary input terminal 18 and through internal circuitry to output terminal 36, continuing through conductor 35 and finally to positive terminal 34 on the fuse block 32. Voltage maintenance module 13 also includes a start sensor terminal 44 connected by conductor 45 to start terminal 46 of ignition switch 48. The battery terminal 50 of ignition switch 48 is connected by conductor 51 to the positive terminal 52 of the starter solenoid 54 on starter 40. The starter terminal 46 of switch 48 is also coupled to the starter solenoid 54 by conductor 47 to pull-in coil terminal 56 of starter 40.

When ignition switch 48 is placed in the start position, current flows from the positive terminal 16 of battery 12 through conductors 37 and 51 to battery terminal 50 to the start terminal 46 of switch 48 through conductor 47 to terminal 56, which causes the pull-in coil in the starter solenoid 54 of starter 40 to close its contacts. When the contacts close, current from battery 12 is coupled through conductors 37 and 23 to starter motor 40 and when this coupling occurs, voltage at the positive terminal 16 of battery 12 drops as a result of starter motor 40 drawing excessive current at two instances, initially, when the starter motor 40 initially starts its rotation and secondly, when the starter drive engages the engine fly wheel and has to overcome the internal friction and mass of the engines moving components. When the terminal 46 of switch 48 is energized, terminal 44 of voltage maintenance module 13 becomes energized through conductor 45 causing the internal circuitry to couple secondary input terminal 22 to output terminal 36. This allows current from the positive terminal 20 of battery 14 to energize terminal 34 on fuse block 32. The current flows from the positive terminal 20 of battery 14 through conductor 21 to secondary input terminal 22 of the voltage maintenance module 13 through its components to output terminal 36 through conductor 35 to positive terminal 34 of the fuse box 32. When the ignition switch 48 is placed in either run or off positions, voltage is no longer present at terminal 50 and this enables starter 40 to disengage and also allows voltage maintenance module 13 to revert to its standby mode.

Engaging ignition switch 58 to start position will cause voltage maintenance module 13 to respond in the same manner as when ignition switch 48 was placed in its start position. However, ignition switch 60 will not activate the voltage maintenance module 10.

Referring to FIG. 2 in conjunction with FIG. 1, internally ground terminal 28 is connected to a grounding conductor 62. A generator start sensing input terminal 63 is connected by a conductor 65 to a start terminal 67 of starter switch 58, in a manner similar to the interconnection between terminal 44 and ignition switch 48.

Module 13 includes a first relay switch 64 that has a fixed contact 66, a movable contact 68, an armature 70 and a coil 72. Secondary battery input 22 is connected to fixed contact 66 by conductors 74 and 76 and a diode 78 that is placed between those conductors. Primary battery input 18 is connected through a conductor 84, a diode 86, and conductors 88 and 90 to output terminal 36. The output terminal is also connected through conductor 90 to a conductor 92, which is connected through node 94 to one terminal of coil 72. A filtering capacitor 96 is connected by its positive terminal to conductor 92 and a current limiting resistor 98 is coupled at one terminal to the negative terminal of capacitor 96. The other terminal of resistor 98 is connected to ground conductor 62.

Switch actuator means 100 are employed to alternate relay switch 64 between first and second states wherein voltage is applied from the secondary and primary batteries, respectively to the electrical accessory fuse box. In particular, such switch actuator means comprise a pair of transistor switches 102 and 104. Switch 102 includes a base 106 that is connected through conductors 108 and 110 and biasing resistor 112 to engine start input terminal 44. Similarly, transistor switch 104 includes a base 114 that is connected through conductors 116 and 118 and biasing resistor 120 to generator start terminal 63. Transistor 102 includes a collector 122 that is connected through conductors 124 and 126 to a terminal 128 of coil 72. Similarly, transistor 104 includes a collector 130 that is connected through conductors 132 and 126 to coil terminal 128. Transistors 102 and 104 also include respective emitters 134 and 136 that are connected through biasing resistor 138 to ground conductor 62.

During normal operation of the boat, voltage from primary battery 12 is provided to primary input 18. Current then flows through conductor 84 to diode 86, which is now forward biased so that it conducts current through conductors 88 and 90 to output terminal 36 and from there to the electrical accessory fuse box 32. Current also flows through conductor 92 to charge capacitor 96. During such normal operation movable contact 68 of relay switch 64 is biased into an open condition relative to fixed contact 66 so that the secondary battery input 22 is electrically disconnected from output 36. In this way only the primary battery 12 operates the electrical accessories.

When ignition switch 48 is turned to the start position, start terminal 46 is energized and a signal is provided over line 45 to start input terminal 44. As a result, a signal is provided through conductor 110, resistor 112 and conductor 108 to base 106 of transistor 102. When the base 106 of transistor 102 is energized, the transistor is biased on and is in a conducting state so that current flows from conductor 92 through node 94, coil 72 and conductors 126 and 124 to the collector 122 of transistor 102. The current flows through transistor 102 and resistor 138 to ground conductor 62. As a result, coil 72 is energized so that armature 70 pulls movable contact 68 to the closed position, shown in phantom in FIG. 2, wherein contact 68 engages fixed contact 66. This closes a circuit between secondary battery 14 and output terminal 36. Accordingly, current flows from secondary battery 14 though conductor 21 to secondary input 22. This current continues through conductor 76, diode 78 and conductor 74 to fixed contact 66. From there the current flows through closed contact 68 and conductors 92 and 90 to output terminal 36. As the current from secondary battery 14 is introduced through the circuit, the voltage from primary battery 12 drops, for example to 9 - 11 volts, due to the operation of starter 40. As a result, the voltage from secondary battery 14, which is typically at approximately a full 12 volts or more, is greater than the voltage from primary battery 12 that is present at input terminal 18 and conductor 84. Because the voltage from the secondary battery 12 that is present at conductors 88 and 90 is higher than the voltage from primary battery 12 that is present at conductor 84, diode 86 is in a reversed biased state and no longer conducts current. Instead, forward biased diode 78 conducts current from positive terminal 20 of secondary battery 14 through conductor 21 to secondary input terminal 22 and from there through contacts 66 and 68 of relay 64 to output terminal 36. Accordingly, during starter activation the secondary battery 14 provides the entire voltage output to maintain the electrical components in an energized condition.

As soon as the engine is started, the starter 40 is deactivated in a conventional manner. As a result, the start signal from terminal 46 is eliminated and a start signal no longer appears at input terminal 44. This causes transistor switch 102 to switch to a non-conducting state. As a result, relay coil 72 is de-energized and armature 70 allows movable contact 68 to resume its normally opened condition. This causes secondary battery 14 to be disconnected from output terminal 36. At the same time, the starter 40 connected to battery 12 also releases, thereby discontinuing its current demand on battery 12. The voltage level of primary battery 12 rises due to the starter 40 being disengaged and the alternator for battery 12 begins to charge the battery. Shortly, battery 12 is recharged to a level of 12 volts so that diode 86 is in a forward biased state. As a result, current flows through diode 86 to conductors 88 and 90 and therefrom to output terminal 36. The output terminal 36 and the electrical accessories connected thereto thereafter continue to be energized by the primary battery 12 for as long as the boat continues normal operation. Although diode 78 is still forward biased, it is now disconnected from output terminal 36 and therefore does not conduct current. As a result, the energy in secondary battery 14 remains untapped by the module 13 during normal operation of the boat.

Energizing terminal 63 will yield the same results as energizing terminal 44 and the transistorized trigger circuit allows the triggering sources to remain isolated and fall into to a lower voltage without disengaging the relay. Biasing resistors 112 and 120 prevent false triggering of transistors 102 and 104. False triggering may occur when high voltage from a battery charger is placed across the terminals of primary battery 12, or as the result of leakage current through the transistors, thus allowing relay 64 to remain engaged after the starting signal is removed from terminals 44 and 63. Filtering capacitor 96 reduces electrical interference which may be present at input terminals 18 and 22 thus providing an essentially pure DC voltage at output terminal 36. Filter capacitor 96 also acts to suppress the electrical switching noise of relay 64 as it switches between inputs. Current limiting resistor 98 acts to dampen the surge of current as filter capacitor 96 charges. This reduces the momentary current demand placed on diode 86 each time power to the voltage maintenance module is switched on.

The voltage maintenance module of this invention is thus only active when starting the boat's primary engine or engines and responds automatically to a voltage signal present at the primary engine ignition switch starting terminal and is intended to solely provide power to marine electronic panels by sensing the start signal from the primary engine's ignition switch. The two unidirectional voltage batteries 12 and 14 are coupled at their negative terminals 24 and 26 by conductor 25 and the positive terminals 16 and 20 are isolated and are of equal amplitude under normal conditions. The components of the voltage maintenance module may be conveniently mounted on a circuit board having a terminal strip along one edge thereof for connection with the terminals 18, 22, 36, 44, 63 and 28. Also mounted is the relay 64, resistor 98, capacitor 96, and the various other transistors and related components shown in FIG. 2. It is pointed out that the components may be mounted in any relationship and on a structure that enables them to be retained in water resistant condition for operation over a long period of time in a marine application. The voltage maintenance system operates with the two separate input terminals being isolated from each other internally by the diode network and relay with the diodes preventing current feedback between the input voltage differentials. The relay engages only during primary engine starting and allows current to flow from the secondary battery during primary engine starting. This enables the secondary battery to remain untapped by the voltage maintenance module 13 and fully charged when underway, sitting idle or fishing since the electronic components remain isolated from the secondary battery until the primary engine is being started. On boats with twin engines, this allows emergency starting using the secondary battery to jumpstart the primary engine in the event of a discharge severe enough that the primary engine will not crank from its own battery. The voltage maintenance module's two inputs are connected to the batteries with the primary input connected to the primary battery and the second input connected to the secondary battery, with additional terminals being connected to the starter solenoid input, one being for the main primary engine and the other for a generator with each being isolated from the other by transistors to prevent cross starting. The voltage maintenance system will maintain an adequate voltage level to sustain operation of the electronic components on the boat under normal operating conditions. This system eliminates the annoyance and time consumed in repowering electronic components each time a boat owner restarts the boat and enables a boat owner to concentrate on fishing or other activities rather than spending time resetting the electronic components which can occupy substantially all of the time during a fishing trip if the boat engine is started a number of times.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be restored to, falling within the scope of the invention.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. A voltage maintenance system for an engine driven vehicle having primary battery means, a starter that is energized by said primary battery means, ignition means for selectively and momentarily activating said starter to start said engine and electrical accessory means that are electrically connected to and energized by said primary battery means during normal operation of the vehicle, said system comprising:

secondary battery means;

means for sensing activation and subsequent deactivation of said starter each time said engine is started; and switching means, responsive to said means for sensing, for electrically connecting said secondary battery means to said electrical accessory means and electrically isolating said primary battery means from said electrical accessory means such that said secondary battery means energize said electrical accessory means each time activation of said starter is sensed, and for electrically disconnecting said secondary battery means from said electrical accessory means and electrically re-connecting said primary battery means to said electrical accessory means when said starter is subsequently deactivated.

2. The system of claim 1 in which said means for sensing include means for generating and conducting a start signal indicative of activation of said starter, which start signal is subsequently eliminated upon deactivation of said starter.

3. The system of claim 2 in which said switching means include a first switch and switch actuator means that are responsive to said start signal for activating said switch to connect said secondary battery means to and electrically isolate said primary battery means from said electrical accessory means and are further responsive to the subsequent elimination of said start signal for directing said first switch to disconnect said secondary battery means from and electrically re-connect said primary battery means to said electrical accessory means.

4. The system of claim 3 in which said switch actuator means include a second switch.

5. The system of claim 2 in which said switching means include a relay switch and means, that are further responsive to said start signal, for energizing said relay switch to connect said secondary battery means to and electrically isolate said primary battery means from said electrical accessory means, and further responsive to the subsequent elimination of said start signal, for de-energizing said relay switch to disconnect said secondary battery means from and electrically re-connect said primary battery means to said electrical accessory means.

6. The system of claim 5 in which said means for energizing and de-energizing said relay switch include transistor switch means.

7. The system of claim 6 in which said relay switch includes a coil that is selectively connected at one end to said primary battery means when said primary battery means are electrically connected to said electrical accessory means and to said secondary battery means when said secondary battery means are electrically connected to said electrical accessory means, and in which said transistor switch includes a base that is electrically connected to said means for generating and conducting for receiving said start signal therefrom, a collector that is connected to the other end of said coil and an emitter that is connected to a ground conductor, said transistor switch being responsive to the presence of said start signal at said base for conducting current through said coil to energize said relay switch and being responsive to a subsequent elimination of said start signal from said base for blocking the flow of current through said coil to de-energize said relay switch.

8. The system of claim 1 further including primary input means and secondary input means connected to said primary and secondary battery means, respectively, and output means connected between said primary input means and said electrical accessory means, said switching means being alternated between a first state wherein said secondary input means and said output means are electrically connected and said primary input means are electrically isolated from said output means, and a second state wherein said secondary input means are disconnected from said output means and said primary input means are electrically connected to said output means.

9. The system of claim 8 in which primary diode means are disposed between said primary input means and said output means for restricting current flow from said output means to said primary input means when said output means are at a greater voltage than said primary input means.

10. A voltage maintenance system for an engine driven boat having primary battery means, a starter that is energized by said primary battery means, ignition means for selectively and momentarily activating said starter to start said engine and electrical accessory means that are electrically connected to and energized by said primary battery means during normal operation of the vehicle, said system comprising:
secondary battery means;
means for sensing activation and subsequent deactivation of said starter each time said engine is started; and
switching means, responsive to said means for sensing, for electrically connecting said secondary battery means to said electrical accessory means and electrically isolating said primary battery means from said electrical accessory means such that said secondary battery means energize said electrical accessory means each time activation of said starter is sensed, and for electrically disconnecting said secondary battery means from said electrical accessory means and electrically re-connecting said primary battery means to said electrical accessory means when said starter is subsequently deactivated.

* * * * *